United States Patent [19]

Jones

[11] 4,333,548
[45] Jun. 8, 1982

[54] WEIGHT DRIVEN ROTARY POWER GENERATING APPARATUS

[76] Inventor: Sterling W. Jones, Rte. 1, Box 118, Rowland, N.C. 28383

[21] Appl. No.: 146,353

[22] Filed: May 2, 1980

[51] Int. Cl.³ .............................................. F03G 3/02
[52] U.S. Cl. ........................................ 185/33; 185/27
[58] Field of Search ...................... 185/4, 5, 6, 7, 27, 185/32, 33

[56] References Cited

U.S. PATENT DOCUMENTS 33,139  8/1861  Giroudat .............................. 185/27

FOREIGN PATENT DOCUMENTS 382517 10/1923 Fed. Rep. of Germany ........ 185/27
543065  5/1922 France ................................. 185/27
567486 12/1923 France ................................. 185/27
153245 11/1920 United Kingdom .................. 185/27

Primary Examiner—Allan D. Herrmann
Attorney, Agent, or Firm—Mills and Coats

[57] ABSTRACT

The present invention entails a weight driven rotary power generating apparatus that is designed to efficiently provide energy that can be harnessed and effectively utilized. Forming the weight driven rotary power generating apparatus of the present invention is a heavy flywheel rotatively mounted within a frame structure and including a plurality of radially extending and circumferentially spaced projectors or drive panels that extends from the flywheel. Peripherally disposed about said flywheel is a closed, off-axis weight track that includes a plurality of weights movable therein. Because of the off-axis orientation with respect to the flywheel, the track is oriented such that as the weights fall due to gravity through a falling run of said track, they engage said projectors projecting from said flywheel and act to drive said flywheel. Once past the falling run, the power generating apparatus is provided with a chain weight transfer assembly that engages the weights as they enter a return run of said track and act to transfer said weights to an elevated position where they may be held and selectively released in accordance with the RPM of said flywheel. Once released, the respective weights again move through the falling run and act to drive the flywheel as just described.

10 Claims, 3 Drawing Figures

WEIGHT DRIVEN ROTARY POWER GENERATING APPARATUS

FIELD OF INVENTION

The present invention relates to rotary power devices and more particularly to a rotary power generating and/or distributing device that utilizes a series of peripheral moving weights to engage a central flywheel for driving the same and generating an output torque or power component.

BACKGROUND OF INVENTION

Everyone today appreciates the problems of energy faced by our nation and the world. Petroleum fuel has continued to increase in cost and is expected to continue to increase in cost. Moreover, aside from the price of petroleum fuel, we have experienced a scarcity of petroleum fuel. In some cases, petroleum fuel has not been available at any price.

This has led to a national policy that first aims at conserving our energy resources and secondly aims at developing new and alternate forms of energy. It appears that this national policy is at least partially working and is at least at this point somewhat successful. Individuals are conserving energy now, and there are signs that we are beginning to develop and utilize alternate energy sources such as solar energy, wood, coal and alcohol based fuels.

But still our efforts in conserving energy and developing and utilizing alternate sources of energy has not been sufficient in terms of the seriousness of our energy problems. More conservation is needed, new sources of energy must be developed, and greater use of alternate sources of energy is required.

In the area of energy conservation and development, one area that has lack development is in the area of machinery designed to more efficiently deliver energy. It is known that certain types of machines can be designed to assist in generating power and efficiently delivering this energy. However, little development in this area has been carried out to date.

SUMMARY OF INVENTION

The present invention entails a mechanical rotary power generating apparatus for assisting in the more efficient generation of energy. In particular, the present invention entails a flywheel rotatively mounted in a frame structure and is provided with a peripheral track assembly therearound that includes a plurality of weights movable therein. The apparatus is designed such that as the weights cycle around the track structure, the respective weights during one period of the cycle engage the inner flywheel and cause the same to be rotatively driven. During a portion of the cycle of the respective weights, a weight transfer chain assembly is provided for transferring the weights from a lower position to an upper elevated position where the respective weights can be selectively released in accordance with the RPM of the flywheel. Thus, it is appreciated that the continuous cycling of the weight around the periphery of the flywheel acts to engage the flywheel and to drive the same. The inherent potential energy of the weights and the inertia of the weights and flywheel act to efficiently deliver energy.

It is, therefore, an object of the present invention to provide a mechanical rotary power generating and/or distributing apparatus that utilizes the inherent energy and inertia of a plurality of cycling weights to drive a flywheel and to efficiently produce energy.

A further object of the present invention resides in the provision of a rotary power generating and/or distributing apparatus that is effective to drive a weighted flywheel with a minimum of input energy, by the provision of a series of circumferential cycling weights that are operative to engage the flywheel as the weights move through a falling run due to gravity, wherein the apparatus is provided with means for transferring the weights after they have stopped or slowed down to an upper position where the weights will again include potential energy due to their elevation.

Still a further object of the present invention is to provide a rotary powered generating apparatus of the character described above that is relatively simple in construction and inexpensive in terms of its value, and which is durable and easy to maintain.

In addition, it is an object of the present invention to provide a mechanical rotary power generating apparatus of the character referred to above that can be utilized in numerous situations to more efficiently generate power inasmuch as the apparatus is designed to provide an output drive that can be easily coupled to an electrical generator to drive the same or to drive any other type of machine.

Other objects and advantages of the present invention will become apparent from a study of the following description and the accompanying drawings which are merely illustrative of the present invention.

WEIGHT DRIVEN ROTARY POWER GENERATING AND/OR DISTRIBUTION APPARATUS

Figure 1:
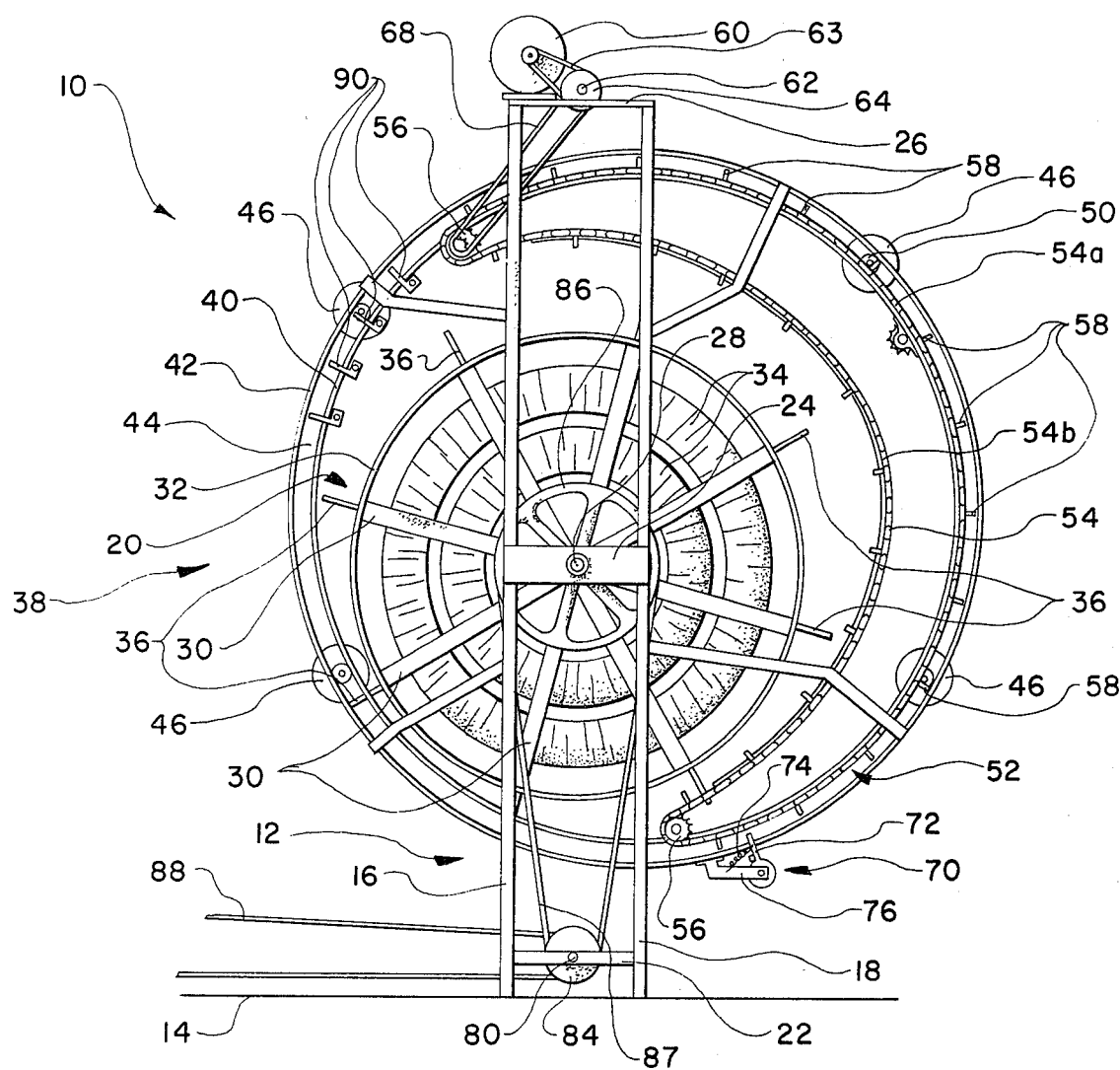
FIG. 1 is a side elevational view of the weight driven rotary power generating apparatus of the present invention.
Figure 2:
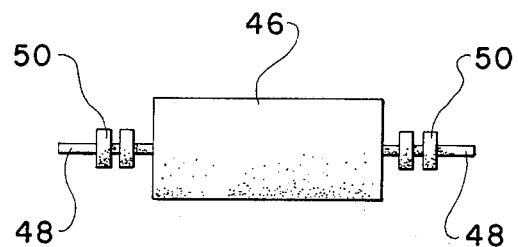
FIG. 2 is a side view of a respective weight adapted to move within the weight driven rotary power generating apparatus shown in FIG. 1.

With further reference to the drawings, the rotary powered generating apparatus of the present invention is shown therein and indicated generally by the numeral 10. Viewing rotary power generating apparatus 10 in detail, the same comprises a frame structure indicated generally by the numeral 12. Frame structure 12 is of a generally U-shape and about each side thereof includes a pair of upstanding parallel legs 16 and 18 that are appropriately interconnected by cross supports 22, 24 and 26. The opposite sides of frame structure 12 are interconnected about an upper support assembly that defines an area therebetween that receives a flywheel indicated generally by the numeral 20. As seen in FIG. 1, frame structure 12 of the rotary powered generating apparatus 10 is adapted to be supported above a floor or horizontal support structure indicated by the numeral 14.

As pointed out above, between the two sides of frame structure 12 there is an opening defined that receives the flywheel 20. Flywheel 20 is secured to a flywheel shaft 28 that is rotatively journaled between opposite cross supports 24.

Extending radially from flywheel shaft 28 is a plurality of spaced apart radial side bars 30 that form respective opposite sides of flywheel 20. About the outer circumference of the flywheel 20 is provided a circumferential band 32 that generally encloses the outer circumference of flywheel 20 and extends between corresponding laterally spaced radial side bars 30.

Disposed interiorly of circumferential band 32 is a network of weighted tubes 34 that provide flywheel 20 with substantial mass. Although the weighted mass may be provided in various different designs, in the embodiment illustrated herein flywheel 20 includes segments of pipe or conduit that is filled with a concrete mix.

Projecting radially from circumferential band 32 is a plurality of circumferentially spaced projectors or drive panels 36. The significance of projectors or drive panels 36 will be more fully understood from subsequent portions of this disclosure.

Supported by frame structure 12 and peripherally disposed about flywheel 20 is a weight guide assembly indicated generally by the numeral 38. Weight guide assembly 38 is oriented in an off-set relationship relative to the axis of flywheel shaft 28.

Viewing weight guide assembly 38 in more detail, the same includes a pair of laterally spaced tracks with each track including an inner and outer radial band 40 and 42 that define a raceway 44 therebetween. The two tracks of the weight guide assembly 38 are laterally spaced apart and adapted to receive a plurality of weights 46 therebetween, each weight having a cylindrical body surface, a shaft 48 extending therebetween and a pair of bearings 50 disposed on opposite sides of shaft 48 and confined within a respective raceway 44. This allows the respective weights 46 to move around the weight guide assembly in a rolling fashion.

Figure 3:
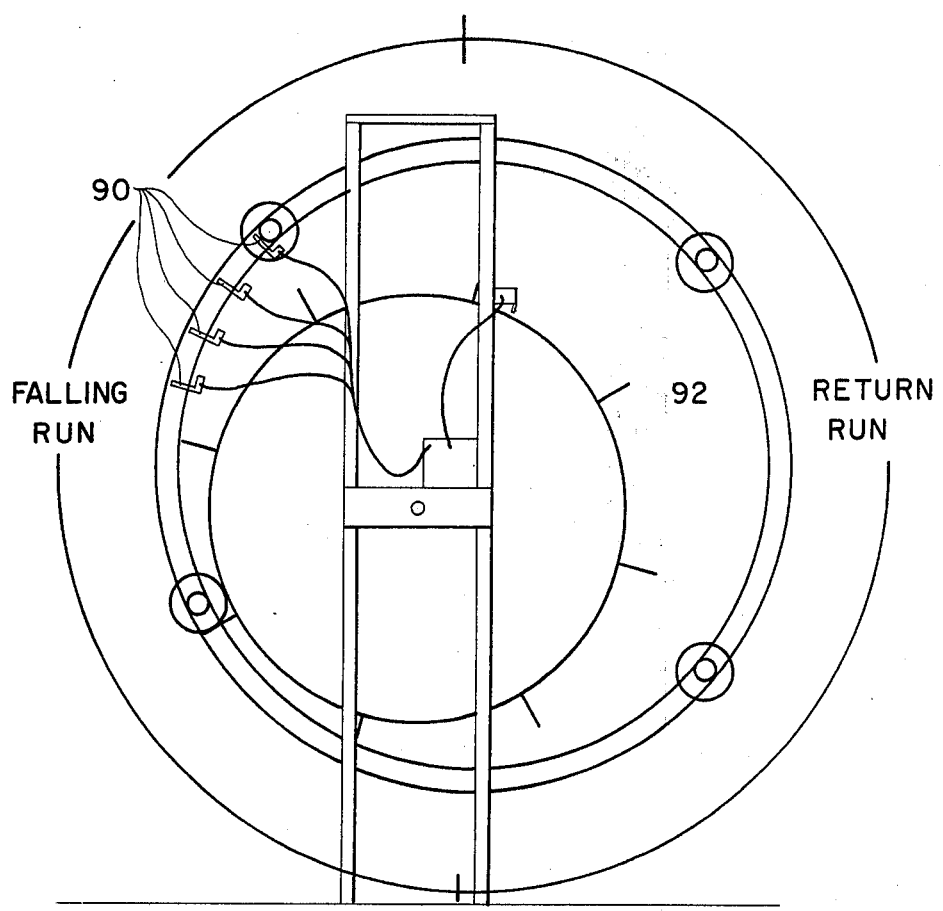
FIG. 3 is a schematic illustration of the invention shown in FIG. 1 particularly illustrating the the falling run and the return run of the present invention.

As viewed in FIG. 3, it is seen for the purposes of explanation that the weight guide assembly 38 as viewed from the side, includes two runs, one run being referred to as a falling run and the other run being referred to as a return run. With respect to the falling run portion of the weight guide assembly 38, this portion allows the weight to fall from an elevated position just passed top dead center to a lower position in said weight guide assembly 38. The return run, on the other hand, is that portion of the weight guide assembly where the respective weights 46 are transferred back to an upper elevated position just passed top dead center where the same weights may again be released to fall through said falling run.

In the present invention, the off-set relationship of the tracks with respect to the rotational axis of flywheel 20 is very important. In this regard, it is seen that the lower portion of the falling run is directed closely adjacent the circumference of flywheel 20. This is to provide for engagement of the respective falling weights 46 with any one of the series of projectors 36 extending from the circumferential band 32 of flywheel 20. As will be more fully understood from subsequent discussions, the impact from the respective weights against the projectors 36 gives rise to a counterclockwise rotation of flywheel 20.

As the respective weights fall through the falling run, their inertia will carry them passed the lowermost extremity of weight guide assembly 38 over into the segment referred to as the return run. But to transfer the respective weights up the return run of the weight guide assembly 38, the present invention provides weight transfer means indicated generally by the numeral 52. In the case of the present disclosure, weight transfer means 52 includes a pair of chain drives 54 on each side of the return run of the weight guide assembly 38. As seen in FIG. 1, chain drive 54 includes a drive run 54a and an inner return chain run 54b and wherein the entire endless chain drive 54 on each side is trained around a series of sprockets 56. Each chain drive 54 on each side of the weight guide assembly 38 is provided with aligned and corresponding upstanding pins or weight carriers 58 that are adapted to engage opposite shaft portions 48 of respective weights 56 and to advance them upwardly around the respective tracks of the weight guide assembly to a position just passed top dead center where the respective weights are released and where the respective weights assume potential energy due to their elevation within the weight guide assembly 38.

In order to drive the respective chain drives 54, there is provided an electric motor 60 mounted about the top frame structure 12 and operatively connected to drive a jack shaft 62 through a pulley or sheave 64 that is connected to jack shaft 62. A drive belt 63 is operatively interconnected between motor 60 and sheave 64 for driving jack shaft 62. A second chain drive 68 is operatively driven by jack shaft 62 and is trained around a drive sprocket operative to drive the respective chain drives 54.

Provided about the return run of the respective tracks is a safety stop means indicated generally by the numeral 70 for preventing the respective weights 46 from returning substantially in a clockwise fashion as viewed in FIG. 1 in the event that the respective chain drives 54 might be inoperative to catch and/or transfer the respective weights 46 to their point of release about weight guide assembly 38. Safety stop means 70 is in the form of a ratchet type stop inasmuch as the respective weights may pass when going in a counterclockwise fashion but are stopped when moving clockwise with respect to the safety stop means 70. To provide for this, there is provided a holding bar 72 that is pivotably mounted about a finger holder 76 and which is held in a stop position by a spring 74 interconnected between the holding bar 72 and the finger support holder 76.

In order to efficiently utilize the rotary power generating apparatus of the present invention, it is desirable to release the respective weights 46 in accordance with the RPM of the flywheel 20. Expressed in another way, it is desirable to retain the respective weights 46 in an elevated position just passed top dead center until the RPM of the flywheel 20 has been reduced to a selected or threshold value, at which time the leading weight 46 is released and allowed to fall and move downwardly through said falling run of said weight guide assembly.

To accomplish this design objective, on each side of the tracks comprising the weight guide assembly just passed top dead center, as viewed in FIG. 1, there is provided a series of corresponding catches 90 for receiving and holding one or more weights 46 at this position. Catches 90 would be provided in corresponding pairs and would be of such a number as to hold all of the weights associated with any particular design. For controlling the release of the respective catches 90, there is provided a release control system 92 that is only shown diagrammatically that would be adapted to selectively release respective latches 90 in accordance with the RPM of the flywheel 20. Details of such a release control system is not shown herein in detail because such is not material per se to the present invention as this type of control can be conventionally found in electrical control systems.

Turning to the output drive of the rotary power generating apparatus 10 of the present invention, it is seen that the same includes a lower jack shaft 80 rotatively journaled between lower cross supports 22 extending between respective legs 16 and 18. Jack shaft 80 includes at least one sheave 84 secured thereto and drivingly interconnected with a pulley or sheave 86 that is secured to flywheel shaft 28. There is provided a drive belt 87 operatively interconnected between pulley 84 and pulley 86 such that the driving torque associated with said flywheel 20 can be transferred to said jack shaft 80. From jack shaft 80, through an appropriate pulley or drive sheave, the generated torque or power can be transferred therefrom by output drive belt 88 that would lead to a device such as a generator that could be driven by the apparatus of the present invention.

Therefore, in summary, it is seen that the plurality of weights 46 act to cycle around the respective tracks forming the weight guide assembly 38 and due to the orientation thereof, during a particular segment of the movement of the weights, they engage the projectors 36 extending from the flywheel 20. The engagement of the projectors 36 by the falling weights 46, cause the flywheel to be rotatively driven counterclockwise.

As the weights move down the falling run they pass the lower bottom area of the weight guide assembly 38 and advance on into the return run. As the weights move into the return run, they are picked up by the fingers or weight carriers 58 projecting from the respective chain drives 54 and carried to an upper elevated position just passed top dead center where the respective weights may be held by corresponding latches 90 until they are released by the release control system 92 that is operatively actuated by the rotation of the flywheel 20. This cycling of the weights 46 is maintained continuously such that the weight actually drive the flywheel 20 and the power generated by the flywheel 20 is only transferred to the lower jack shaft 80 and the driving torque thereof is used as an output drive to drive any type of machine or device design.

To start the apparatus of the present invention 10, an input driving force may be utilized to actually drive the flywheel itself through jack shaft 80. But in the case of the present disclosure, the actuation of the electric motor 60 will pull the respective weights to an elevated position after which their release will be operative to begin to drive the flywheel 20.

From the foregoing specification, it is appreciated that the rotary power generating apparatus of the present invention is a practical means of efficiently generating and/or distributing power through a rotary power generating apparatus. The same is especially designed to be used for a wide variety of applications and is relatively simple and inexpensive.

The terms "upper", "lower", "forward", "rearward", etc., have been used herein merely for the convenience of the foregoing specification and in the appended claims to describe the power generating device and its parts as oriented in the drawings. It is to be understood, however, that these terms are in no way limiting to the invention since the power generating device may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A weight actuated power generating apparatus adapted to utilize the energy associated with a plurality of moving weights to drive a flywheel comprising: a frame structure; a flywheel rotatively mounted to said frame structure; a weight guide assembly radially spaced from said flywheel and continually extending therearound in a closed fashion, said weight guide assembly including two axially spaced tracks with each track including two radially spaced retaining members that define an open raceway therebetween; a plurality of weights movably mounted in said weight guide assembly with said weights including opposed bearing means adapted to be retained within said open raceway for allowing said weights to move around said weight guide assembly, and wherein said weight guide assembly includes a falling run through which said weights fall, and a return run through which said weights are returned to an elevated position; means projecting from said flywheel for engagement with respective weights moving through said falling run for enabling said weights to impart a driving force to said flywheel as the respective weights move through said falling run segment of said weight guide assembly; and weight transfer means operatively associated with said apparatus for engaging respective weights after passing through said falling run and for transferring said weights through said return run to an elevated position where the respective weights assume potential energy due to their evaluation within said weight guide assembly, whereby as the weights are allowed to move through said weight guide assembly, respective weights engage the means projecting from said flywheel during the period in which the respective weights are moving through said falling run, wherein engagement of the weights with the flywheel imparts a driving force thereto and generally acts to contribute to the driving force of said flywheel; and output means drivingly interconnected to said flywheel for generating an output torque in response to said flywheel being driven.

2. The weight actuated power generating apparatus of claim 1 wherein said weight guide assembly is oriented in an off axis relationship to the axis of rotation of said flywheel where said weight guide assembly is disposed closely adjacent said flywheel during a portion of said falling run such that the respective weights passing through this segment may engage the means projecting from said flywheel in order that the respective weights may act to impart driving force to said flywheel.

3. The weight actuated power generating apparatus of claim 2 wherein said means projecting from said flywheel for engagement with respective moving weights includes a plurality of circumferentially spaced projections that project from said flywheel into the path of falling weights moving through the falling run of said weight guide assembly.

4. The weight actuated power generating apparatus of claim 3 wherein said weight transfer means includes endless chain means for engaging said weights along an area of said tracks and transferring respective weights to an elevated position on said tracks where the respective weights are placed in a position where they may fall through the influence of gravity through said falling run of said weight guide assembly; and drive means operatively associated with said endless chain means for driving the same.

5. The weight actuated power generating assembly of claim 4 wherein said weight transfer means includes means projecting from said chain means for engaging the respective weights and transferring the same along said tracks of said weight guide assembly.

6. The weight actuated power generating apparatus of claim 5 wherein said endless chain means includes two separate endless chains, one chain disposed about each of said two tracks comprising said weight guide assembly and wherein each endless chain includes a drive run that extends along and adjacent the return run of each respective track of said weight guide assembly.

7. The weight actuated power generating apparatus of claim 6 wherein said apparatus includes safety stop means disposed adjacent said tracks of said weight guide assembly for prohibiting respective weights from falling in a reverse fashion back down through said return run after the weights have passed through the falling run and started up the return run; and wherein said stop means includes ratchet means for allowing the respective weight means to pass thereby but yet adapted to act to stop the weights from passing the opposite direction once the respective weights have passed the stop means.

8. The weight actuated power generating apparatus of claim 7 wherein said flywheel includes a weighted core assembly.

9. The weight actuated power generating assembly of claim 8 further including input drive means for initiating the rotation of said flywheel and for assuring a selected flywheel RPM.

10. The weight actuated rotary power generating apparatus of claim 1 including weight release control means for engaging and releasing respective weights in accordance with the RPM of said flywheel after the weights have been transferred through said return run and passed top dead center of said weight guide assembly and just prior to falling through said falling run thereof; said weight release control means being operative to engage respective weights about this elevated position on said weight guide assembly and to hold the same thereat until the RPM of said flywheel has been lowered passed a selected RPM threshold at which time the leading weight is released and allow to fall by the influence of gravity through said falling run which causes said weight to engage a projector extending readily from said flywheel and to impart a driving force thereto.

* * * * *